(12) United States Patent
Chapman

(10) Patent No.: US 6,349,994 B1
(45) Date of Patent: Feb. 26, 2002

(54) QUICK CHANGE WHEEL SYSTEM FOR A CAMERA DOLLY

(75) Inventor: Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 0 days.

(21) Appl. No.: 09/506,974

(22) Filed: Feb. 18, 2000

(51) Int. Cl.[7] .................................................. B60B 27/00
(52) U.S. Cl. ..................... 301/111.01; 301/113; 301/121
(58) Field of Search .................................. 301/111, 113, 301/121, 122; 29/273; 254/94; 188/32

(56) References Cited

U.S. PATENT DOCUMENTS

| | | | | |
|---|---|---|---|---|
| 895,842 | A | * 8/1908 | Chambers, Jr. | ............. 301/113 |
| 897,444 | A | * 9/1908 | Ballif | ......................... 301/113 |
| 2,402,693 | A | * 6/1946 | Summerbell | ................ 301/113 |
| 4,765,646 | A | * 8/1988 | Cheng | ......................... 301/113 |
| 4,911,270 | A | * 3/1990 | Hudson | ....................... 188/32 |
| 4,943,101 | A | 7/1990 | Chapman | |
| 5,492,353 | A | 2/1996 | Chapman | |
| 5,609,108 | A | 3/1997 | Chapman | |
| 6,024,416 | A | * 2/2000 | Chen et al. | .................. 301/121 |

OTHER PUBLICATIONS

"The Super PeeWee" Technical Manual, Chapman/Leonard Studio Equipment, 1992, 2 pages.
"Super PeeWee® II Parts Manual", Chapman/Leonard Studio Equipment, Dec. 11, 1998, 2 pages.

* cited by examiner

Primary Examiner—Russell D. Stormer
(74) Attorney, Agent, or Firm—Lyon & Lyon LLP

(57) ABSTRACT

A fast wheel changeover system for a camera dolly includes a cap on the end of each wheel axle. The cap has an annular shoulder and a shaft section. A quick release clip has a spring with a bridge section which fits over the cap. A wheel can be quickly changed over by lifting the bridge section over the annular shoulder, by hand and without tools, and then sliding the clip off of the axle. Wedges provided with the dolly allow wheels to be easily lifted off of the ground, for wheel changeover.

15 Claims, 4 Drawing Sheets

QUICK CHANGE WHEEL SYSTEM FOR A CAMERA DOLLY

BACKGROUND OF THE INVENTION

The field of the invention is camera dollies. More specifically, the application relates to a system for allowing quick change of wheels on a camera dolly.

In motion picture or video filming, cameras are often supported on camera dollies, so that camera lens positions, angles, and elevations may be smoothly and easily achieved without interruption. Most camera dollies are pushed by "dolly grips" or camera dolly operators. For use on a relatively smooth and hard surface, such as on a sound stage, or other indoor set, the camera dolly is preferably provided with solid tires having relative high hardness, to reduce rolling friction, and make it easier to push and maneuver the camera dolly. For use on more irregular, surfaces, for example an indoor surface having small cracks, bumps, etc., a softer solid tire is preferred, to absorb shock impulses, albeit with a small increase in rolling friction. For use on still more irregular surfaces, pneumatic tires are typically used, to provide a higher degree of shock absorption, although with a slightly greater increase in rolling friction. For use on unpaved surfaces, such as grass, sand, etc., or in other applications where a maximum level of smoothness in dolly movement is required, dolly track is laid down, with the dolly wheels rolling on the smooth metal rails of the track. Having a smooth rolling surface, or a way to absorb the shock impacts created when rolling over an irregular surface, is important, as shock impacts generated via the rolling movement of the camera dolly wheels can cause unacceptable movement of the camera lens during filming, resulting in unsteady recorded images.

It is frequently necessary to change the wheels on the camera dolly, to compensate for change in the ground conditions. For example, if a first part of a film sequence takes place indoors, the hard solid wheels may be used. Then, if the sequence continues outdoors, it may then be necessary to change over to a pneumatic or track wheel. While a combined track/pneumatic wheel, as described in U.S. Pat. No. 4,943,101, incorporated herein by reference, has been successfully used in the past, to avoid to wheel changeover when switching between track and pneumatic wheels, it remains necessary to change wheels when the harder solid wheels are needed.

Wheel changeover has conventionally required time and tools. Typically, a screwdriver or wrench is needed to remove a fastener from an axle to remove, and then reinstall, a wheel. As most camera dollies have one pair of wheels at each corner, for a total of eight wheels, wheel changeover can be time consuming. Typically, changing over each wheel, even for a skilled camera dolly grip, requires e.g., 60–80 seconds, so that changing over eight wheels typically takes about 10 minutes. While in most endeavors, ten minutes may be acceptable, motion picture production often requires a large number of highly skilled professionals, and extensive amounts of equipment and supplies, so that production costs can reach $1,000 per minute. Accordingly, saving even a few minutes in production time is highly significant, in terms of production costs. Moreover, in sequences involving fast changing lighting conditions, the ability to film the sequence as desired may depend on how quickly the equipment, including the camera dolly, can be set up.

Accordingly, there remains a need for designs which allow fast changeover of camera dolly wheels.

SUMMARY OF THE INVENTION

In a first aspect of the invention, a camera dolly has a plurality of axles connected directly or indirectly to a camera dolly chassis. The camera dolly wheels are secured onto the axles by quick release clip assemblies. The clip assemblies can be quickly and easily removed and reinstalled, by hand and without tools, to allow fast wheel changeover.

Preferably, a cap is attached to each of the axles, and the quick release clip has a spring which engages the cap. The clip is released by pulling the spring away from the cap, and sliding the clip off of the axle.

In a second aspect of the invention, the release clip has a U-shaped frame having bosses extending outwardly from a land area. The cap preferably has a shaft, a shoulder, and a top surface. The U-shaped frame is advantageously engageable around the cap, with the shoulder of the cap against the land area of the U-shaped frame.

In a third aspect of the invention, the axles of the camera dolly have a diameter equal to or greater than the diameter of the cap, so that the wheels can be removed from the axles, after the quick release clip is removed, but without removing, the cap.

In a fourth aspect of the invention, in a method for wheel changeover in a camera dolly, a second wheel of the camera dolly is rolled up onto a wedge, so that a first wheel of the camera dolly is lifted off of the ground. A quick release clip holding the first wheel onto the first axle is released and removed. The first wheel is removed and replaced with another wheel, and the clip reinstalled. Use of the ramp avoids the need to lift the wheels off the floor to achieve wheel changeover.

Accordingly, it is an object of the invention to provide a fast wheel changeover system for a camera dolly. Other and further objects and advantages will appear below.

BRIEF DESCRIPTION OF THE DRAWINGS

In the drawings, wherein the same reference number indicates the same element throughout the several views.

DETAILED DESCRIPTION OF THE DRAWINGS

Figure 1:
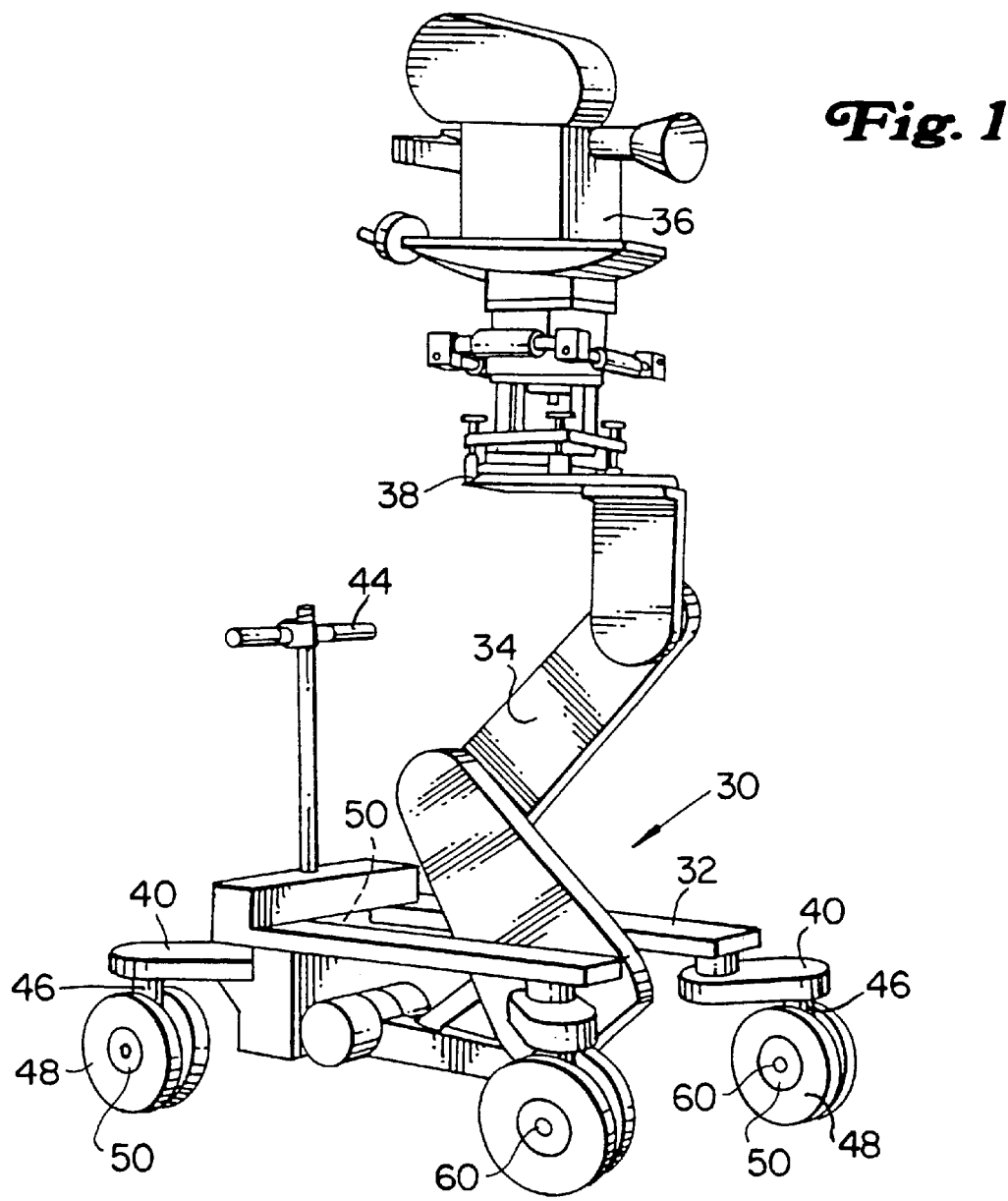
FIG. 1 is a perspective view of a camera dolly.

Turning now in detail to the drawings, as shown in FIG. 1, a camera dolly 30 has an arm 34 attached to a chassis 32. A platform 38 on the arm 34 supports a camera 36. The dolly 30 has wheels 48 rotatably attached to a kingpin 46, at each corner of the chassis 32. The kingpins 46 may be attached directly to the chassis 32, or they may be attached to legs 40, with the legs 40 pivotably attached to the chassis 32 of the dolly 30, as shown in FIG. 1. A steering bar 44 steers the wheels 48, by turning the kingpins 46 to appropriate angles, as described, for example, in U.S. patent application Ser. No. 09/055,012 and PCT/US99/06752, incorporated herein by reference.

Figure 2:
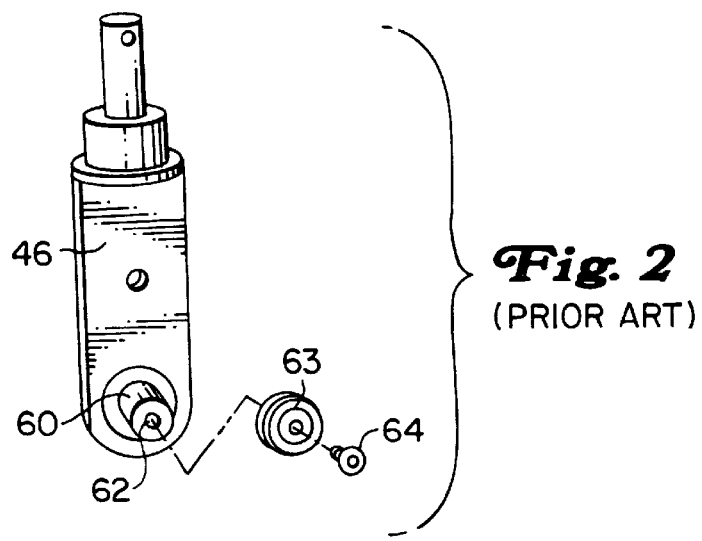
FIG. 2 is a perspective view of a kingpin and retaining washer of a prior art camera dolly.

Referring to FIGS. 1 and 2, the wheels 48 have captured bearings 50. When installed, the inner race of the bearing 50 slides over the axle 60 extending outwardly from the kingpin 46. A fastener 64, such as a screw, extends through a counter sunk retaining washer 63 and threads into an axle hole 62. In this design, the retaining washer 63 holds the wheel 48 onto the axle 60, and the fastener 64 holds the retaining washer 63 in place. To change the wheel 48, the fastener 64 must be removed, using a tool. The wheel to be removed must also be lifted off the ground, to remove it from the axle 60, even after the fastener 64 and retaining washer 63 have been removed. Thus, significant time and effort is required, even for two people, to changeover all eight wheels.

Figure 3:
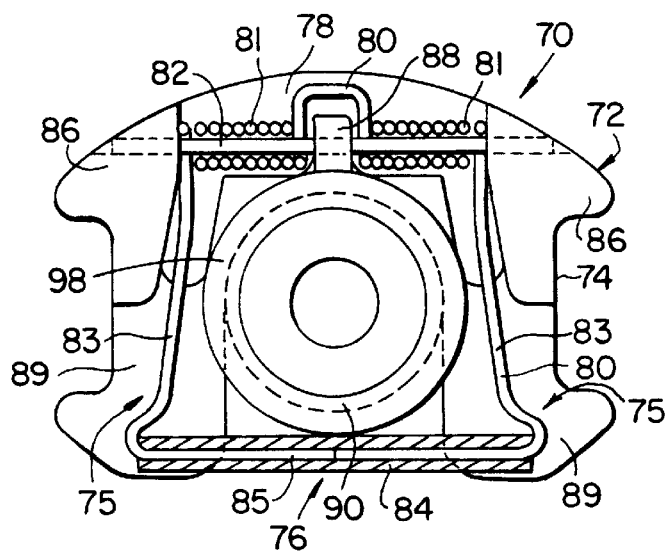
FIG. 3 is a front view of the present quick release clip.
Figure 4:
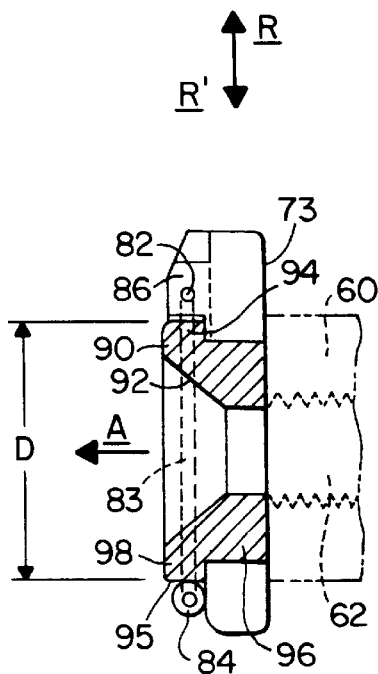
FIG. 4 is a side view thereof, in part section.

A fast wheel changeover system includes a quick release clip 70 and a cap 90 as shown in FIGS. 3 and 4. The clip 70 has a U-shaped frame 72. Grip surfaces 74 are provided on the outside of the legs 75 of the U-shaped frame 72. A spring 80 is attached to the top or closed end 78 of the U-shaped frame 72. The spring 80 has a coil section 81 joined to bridge section 85 via spring leg sections 83. A spring pin 82 extends through the coil section 81, through a center boss 88, and into side bosses 86. A tube 84 is placed on the bridge section 85 of the spring 80.

Referring still to FIGS. 3 and 4, the center boss 88 and side bosses 86 extend upwardly or outwardly on the U-shaped frame 72 from a land area 89 formed on the legs 75. Consequently, as shown in FIG. 4 the leg sections 83 and bridge section 85 of the spring 80 lay substantially flat and parallel to the flat back surface 73 of the U-shaped frame 72. The bridge section 85 of the spring 80 is biased downwardly against the land area 89 on the legs 75.

A cap 90, shown in cross-hatch section in FIG. 4, has a counter sunk opening 92, an annular shoulder 94, and a shaft section 96. With the cap 90 installed into the clip 70, as shown in FIG. 4, the top or outer surface 98 of the cap is substantially flush with the top or outside surfaces of the bosses 86 and 88.

Use of the cap 90 is preferred, as it allows existing camera dollies, such as shown in FIG. 1, to be retrofitted for use with the quick release clip system shown in FIGS. 3 and 4. This retrofit or conversion is made by removing the fastener 64, discarding the retaining washer 63, and replacing it with the cap 90. Alternatively, the cap 90 can be machined or formed directly as part of the axle 60. The retrofit of a dolly 30 from the design shown in FIG. 2 to the design shown in FIGS. 3 and 4, does not require any changes to the axle 60.

Referring to FIGS. 3, 4, 5A, 5B and 6, in use, the cap 90 is attached to the end of the axle 60 by threading the screw or fastener 64 through the counter sunk opening 92 and into the threaded axle hole 62. Referring to FIG. 4, the diameter of the axle 60 is equal to, or greater than the diameter D of the annular shoulder 94. Consequently, the bearing 50 of the wheel 48, which slides onto the axle 60, can pass over the annular shoulder 94, without removing the cap 90. Accordingly, preferably, a cap 90 is attached onto the end of each axle 60 and remains in place on the axle.

Figure 5B:
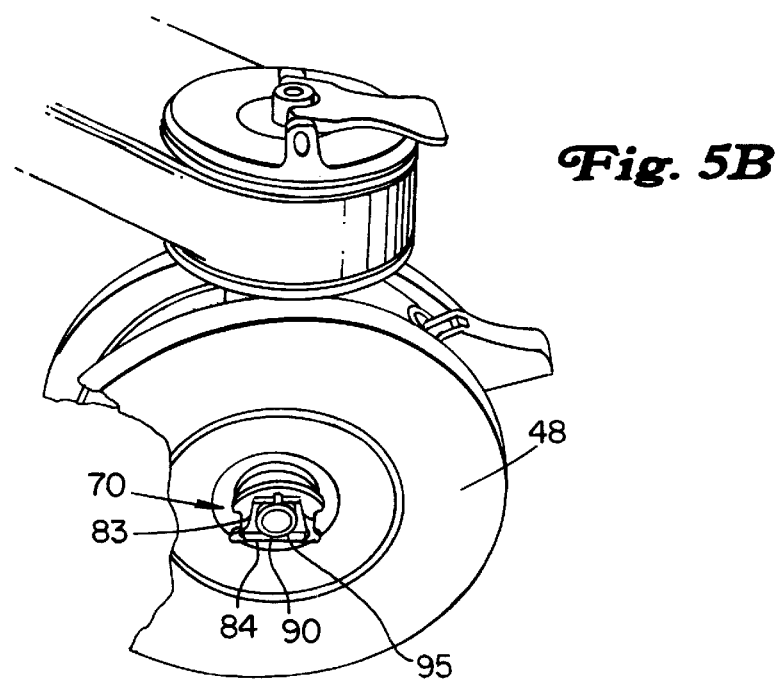
FIG. 5B is a perspective view thereof.
Figure 5A:
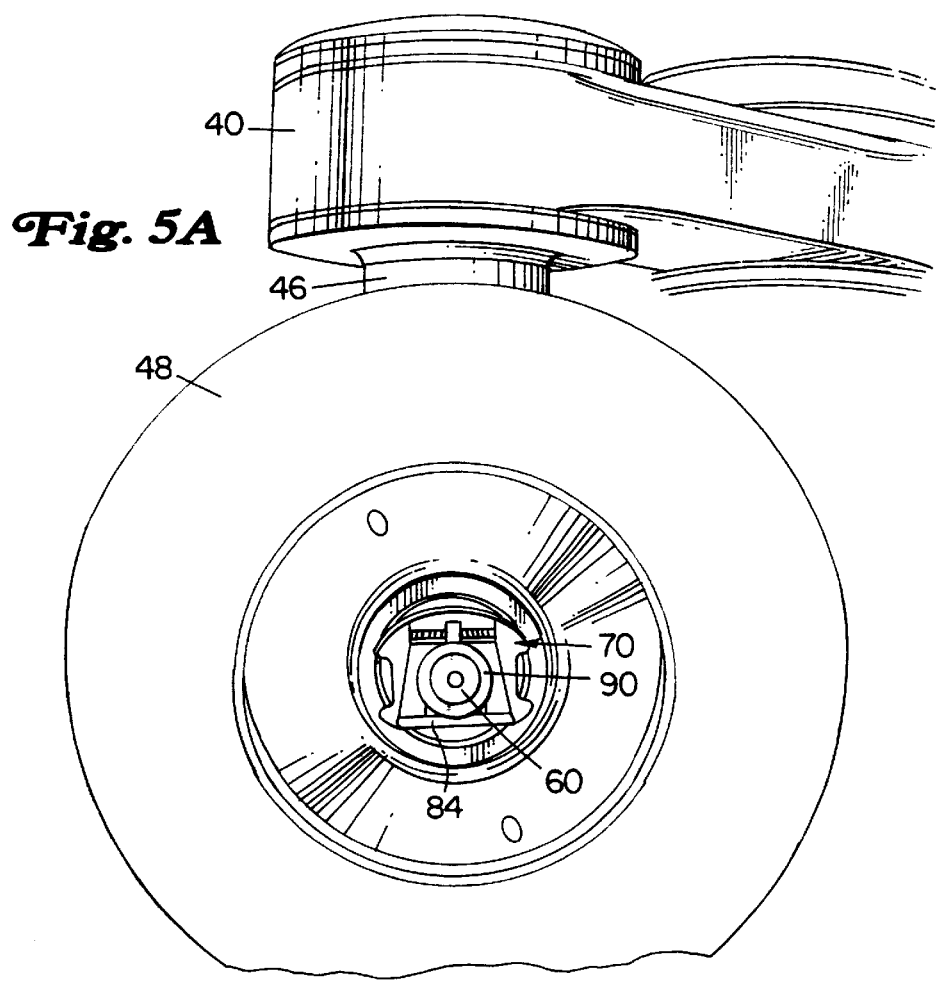
FIG. 5A is a front view of the clip shown in FIGS. 3 and 4 installed on the kingpin shown in FIG. 2.
Figure 6:
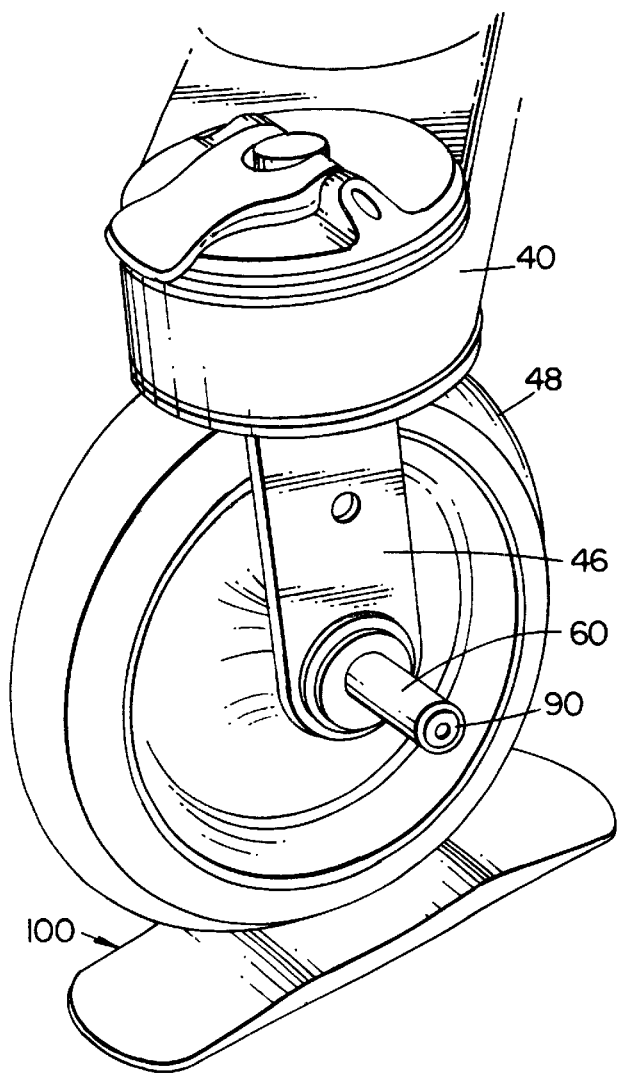
FIG. 6 is a perspective view of the kingpin shown in FIGS. 2 and 5, with the clip and wheel shown in FIG. 5 removed, and with the remaining wheel positioned on a wedge.

The ergonomically designed U-shaped clip can be easily installed by placing fingers in the grip surfaces 74 and by first pushing the clip 70 in against the cap 90, to extend the spring 80, and then moving the clip 70 downwardly, until the spring 80 locks into position against the land area 89. This is a fast and simple operation, easily performed with one hand, as a result of the U-shaped clip. This installation is also easily performed even when the axle is recessed in a wheel well of the wheel. As shown in FIG. 5B, with the clip 70 installed, the tube 84 is against the outside surface 95 of the cap 90 (and tangent to the centerline of the cap.). As the closed end 78 of the clip frame 72 comes to rest against the shaft section 96, the tube 84 on the spring 80 clears the top surface 98 of the cap 90 and moves back down onto the land area 89 of the legs 75.

The clip 70 can then not be pulled axially (in the direction of the arrow A in FIG. 4), as the land area 89 of the legs 75 is captured between the annular shoulder 94 of the cap 90, and the end of the axle 60. The clip 70 also cannot be removed from the axle 60 in radial direction (in the direction of the arrow R or R' in FIG. 4), because the closed end 78 of the clip 70 is stopped by the shaft section 96 of the cap 90, and because the tube 84 on the bridge section 85 of the spring 80 rests against the outside surface 95 of the annular shoulder 94. As a result, the clip 70 holds the wheel 48 onto the axle 60 with the same effectiveness as the fastener 64 and retaining washer 63 shown in FIG. 2. However, the clip 70 is very quickly removed, without tools, by simply placing a finger in the open end 76 of the clip frame 72, behind the tube 84, and pulling the tube 84 away from the land area 89 of the legs 75, so that the tube 84 clears the side surface 95 of the shoulder 94. The clip 70 can then be pulled off the axle 60 in the radial direction R.

Turning to FIGS. 6–9, a wedge 100 is advantageously used to lift wheels of the dolly off the ground, to allow them to be changed over. The wedge 100 has wedge-shaped or angular ends 102 on either side of wheel recess 104. A through hole 106 passes through the center of the wheel recess.

In use, either wheel of the wheel pairs at each corner of the dolly, as shown in FIG. 1, is rolled up onto the wheel recess 104 of the wedge 100. This causes the other wheel of that pair to be lifted off of the ground, so that it can be easily changed over via use of the clip 70 and cap 90, as described above. The procedure is then repeated for the wheel on the other side. Use of the wedge 100 avoids the need for lifting any of the wheels off of the ground. Consequently, the wheel changeover, using the wedge 100 can be easily performed with only one person.

To further speed up wheel changeover, up to four wedges 100 may be used. For example, by aligning a wedge 100 with each of the inside wheels of the four wheel pairs and then pushing, the dolly 30 up onto the wedges 100, the four outer wheels are simultaneously lifted off of the ground and can be changed over. After the outer wheels have been changed over, the procedure is repeated for the inside wheels (with or without using the dolly steering system to move the inside wheels to the outside and vice versa). Thus, all eight wheels can be changed over with only two movements of the dolly 30, the first to lift the outside wheels, and the second to lift the inside wheels. Of course, other wedge configurations and numbers of wedges may be used. The wheel changeover procedure described above can reduce wheel changeover time, by about half.

Figure 9:
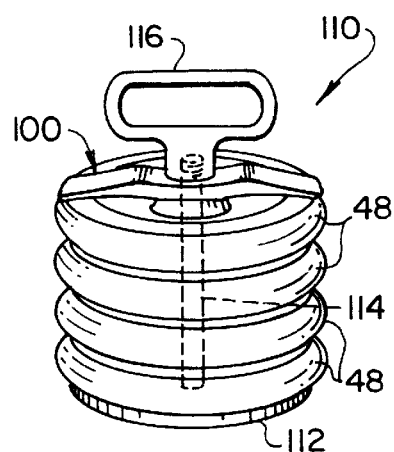
FIG. 9 is a perspective view of a wheel and wedge carrying assembly.
Figure 7:
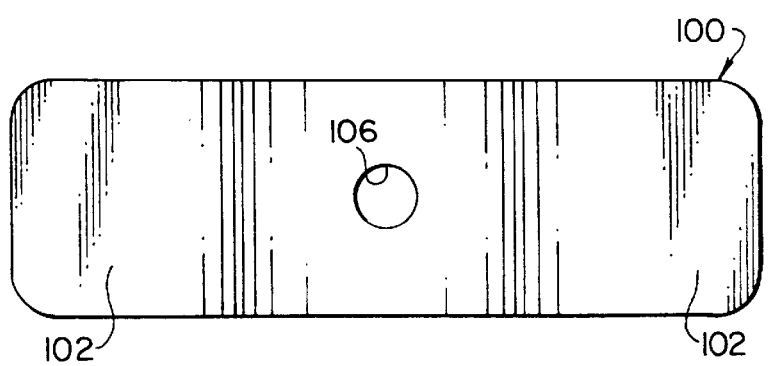
FIG. 7 is a plane view of the wedge shown in FIG. 6.
Figure 8:
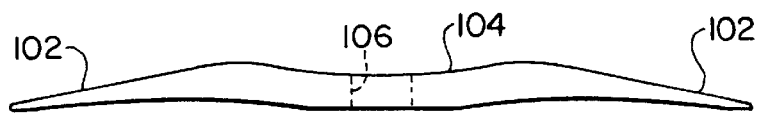
FIG. 8 is a side view thereof.

Referring to FIG. 9, a wheel carrier has a threaded post 114 extending vertically upwardly from a base plate 112. Wheels 48 are placed over the post 114. Wedges (only one in the embodiment shown) are placed on top of the wheels, with the post 114 extending through the holes 106. A handle 116 is then threaded onto the post 114 to secure the wedges 100 and wheels together. The wheel carrier 110 thus provides a convenient and easily accessible way of storing and transporting a changeover wheel set for the camera dolly 30, as well as wedges 100.

Thus, a novel fast wheel changeover system for a camera dolly has been shown and described. Various changes and modifications may of course be made, without departing from the spirit and scope of the invention. The invention, therefore, should not be limited, except to the following claims, and their equivalents.

What is claimed is:

1. A camera dolly comprising:
    a chassis;
    a plurality of axles connected directly or indirectly to the chassis;
    a wheel on each of the axles; and
    a quick release clip assembly on each of the axles, the quick release clip assembly comprising
    a cap attached to the axle with a fastener, and
    a quick release clip engageable between the cap and the axle for holding the wheel onto the axle.

2. The camera dolly of claim 1 wherein the quick release clip comprises a frame having an open end and a closed end, and a spring attached to the frame and having a bridge section extending across and biased against the open end of the frame.

3. The camera dolly of claim 2 wherein the cap includes a shoulder and a shaft section, with the shaft section engageable into the open end of the frame, and with the bridge section of the spring engageable over the shoulder of the cap.

4. A quick release wheel kit for a camera dolly having a plurality of axles, and with a wheel on each axle, comprising:
    a cap adapted to be attached to an axle on the dolly with a fastener;
    a quick release clip attachable onto and removable from the axle without using a tool; and
    a wedge for lifting a wheel off of the ground.

5. A quick release clip assembly for allowing a quick changeover of a wheel on a camera dolly, comprising:
    a quick release clip having a frame having an open end and a closed end; and a spring attached to the frame and having a bridge section extending across and biased against the open end of the frame; and
    a cap having a shoulder and a shaft section, with the shaft section engageable into the open end of the frame, and with the bridge section of the spring engageable over the shoulder of the cap.

6. A method for changing a wheel of a wheel pair on a camera dolly comprising the steps of:
    rolling a second wheel of the wheel pair up onto a wedge, so that a first wheel of the wheel pair, attached to the second wheel via an axle, is lifted off of the ground;
    releasing and removing a quick release clip from the axle;
    removing the first wheel from the axle;
    installing a replacement wheel onto the axle;
    installing the quick release clip back onto the axle, with the quick release clip holding the replacement wheel onto the axle; and
    rolling the second wheel of the wheel pair off of the wedge.

7. The method of claim 6 further comprising the step of releasing and removing the quick release clip without any tools.

8. The method of claim 6 wherein a cap with a shoulder is attached to an end of the axle, and the quick release clip is released by lifting a spring on the quick release cap over the shoulder of the cap.

9. A camera dolly comprising:
    a chassis;
    a plurality of axles connected directly or indirectly to the chassis;
    a wheel on each of the axles; and
    a quick release clip assembly on each of the axles for holding the wheels onto the axles, the quick release clip assembly comprising a quick release clip having a frame having an open end and a closed end, and a spring attached to the frame and having a bridge section extending across and biased against the open end of the frame.

10. The camera dolly of claim 9 further comprising a tube pin around the bridge section of the spring.

11. The camera dolly of claim 9 wherein the frame of the quick release clip is U-shaped, the U-shaped frame having spaced apart legs, the bridge section of the spring extending between, and biased against, the spaced apart legs.

12. The camera dolly of claim 11 further comprising grip surfaces on the U-shaped frame.

13. The camera dolly of claim 9 wherein the quick release clip assembly further comprises a cap attached to the axle with a fastener, the cap having a shoulder and a shaft section, with the shaft section engageable into the open end of the frame, and with the bridge section of the spring engageable over the shoulder of the cap.

14. The camera dolly of claim 13 wherein the frame of the quick release clip has a land area and a plurality of bosses extending outwardly from the land area, with a top surface of the cap substantially flush with the bosses, and with the shoulder of the cap against the land area of the frame.

15. A camera dolly comprising:
    a chassis;
    a plurality of axles connected directly or indirectly to the chassis;
    a wheel on each of the axles; and
    a quick release clip assembly on each of the axles for holding the wheels onto the axles, the quick release clip assembly comprising a cap attached to the axle with a fastener, and a quick release clip engageable around the cap,
    wherein the axles each have a diameter equal to or greater than a diameter of the cap, so that the wheels can be removed from the axles after the quick release clip is removed, but without removing the cap.

* * * * *